US008767377B2

(12) United States Patent
Aoyama et al.

(10) Patent No.: US 8,767,377 B2

(45) Date of Patent: Jul. 1, 2014

(54) ELECTROLYTIC CAPACITOR AND METHOD OF MANUFACTURING THE SAME

(75) Inventors: Tatsuji Aoyama, Kyoto (JP); Hiroyuki Matsuura, Shiga (JP); Yuuki Murata, Yamaguchi (JP); Yukiya Shimoyama, Yamaguchi (JP); Jyunya Kushizaki, Yamaguchi (JP); Hidehiro Sasaki, Toyama (JP)

(73) Assignee: Panasonic Corporation, Osaka (JP)

( * ) Notice: Subject to any disclaimer, the term of this patent is extended or adjusted under 35 U.S.C. 154(b) by 101 days.

(21) Appl. No.: 13/549,640

(22) Filed: Jul. 16, 2012

(65) Prior Publication Data

US 2013/0027847 A1 Jan. 31, 2013

(30) Foreign Application Priority Data

Jul. 25, 2011 (JP) ................................ 2011-161674

(51) Int. Cl.
*H01G 9/02* (2006.01)
*H01G 4/32* (2006.01)

(52) U.S. Cl.
USPC ........... 361/512; 361/502; 361/511; 361/523; 361/530

(58) Field of Classification Search
None
See application file for complete search history.

(56) References Cited

U.S. PATENT DOCUMENTS

| | | | | |
|---|---|---|---|---|
| 7,872,858 | B2 | 1/2011 | Kakuma et al. | |
| 8,405,957 | B2 * | 3/2013 | Katayama et al. | 361/512 |
| 8,637,177 | B2 * | 1/2014 | Nomura et al. | 429/144 |
| 2009/0122466 | A1 * | 5/2009 | Blankenbeckler | 361/502 |
| 2010/0151333 | A1 * | 6/2010 | Nakamori et al. | 429/249 |

FOREIGN PATENT DOCUMENTS

JP 2009-016770 1/2009

* cited by examiner

*Primary Examiner* — Eric Thomas
*Assistant Examiner* — Dion Ferguson
(74) *Attorney, Agent, or Firm* — Panasonic Patent Center

(57) ABSTRACT

An electrolytic capacitor includes a capacitor element and an electrolyte solution impregnated into the capacitor element. The capacitor element includes an anode foil, cathode foil, separator, and a solid electrolytic layer. The anode foil has a dielectric layer on its surface, and the cathode foil confronts the anode foil. The separator is interposed between the anode foil and the cathode foil. The solid electrolytic layer is formed on the surfaces of the anode foil, cathode foil, and separator as an aggregate of fine particles of conductive polymer. The separator has an air-tightness not greater than 2.0 s/100 ml. Sizes of the fine particles measure not greater than 100 nm in diameter, and the fine particles are contained in an amount ranging from 0.3 mg/cm$^2$ to 1.2 mg/cm$^2$ converted to amounts per unit area of the anode foil.

4 Claims, 6 Drawing Sheets

12A 12E 12C 12F 12B
16A 16D 16C 16B
16

ELECTROLYTIC CAPACITOR AND METHOD OF MANUFACTURING THE SAME

BACKGROUND

1. Field

The present invention relates to electrolytic capacitors to be used in a variety of electronic devices, electric devices, industrial devices, and automotive devices. It also relates to a method of manufacturing the same capacitors.

2. Background Art

The electronic devices have adopted digital technology, so that the capacitors employed in output side circuits, e.g. a smoothing circuit or a control circuit, of the power supplies of those devices need to be smaller in size and greater in capacity. On top of that, the capacitor is desired to have a smaller equivalent series resistance (hereinafter simply referred to as ESR) in a high frequency band. A liquid impregnated capacitor that employs liquid electrolyte such as electrolyte solution has been typically used in the output side circuit of the power supply. However, in recent years, solid electrolytic capacitors have been used for the same purpose, and they employ solid electrolyte such as transition metal oxides such as manganese dioxide, organic semiconductor, e.g. TCNQ complex salt, or conductive polymer including polypyrrole, polythiophene, polyaniline. As discussed above, there is a trend toward smaller ESR in the electrolytic capacitors.

The solid electrolytic capacitor is excellent particularly in the smaller ESR than the liquid electrolytic capacitor; however, its recovery action is poor at a failure of anodic oxide film working as dielectric. The solid electrolytic capacitor thus tends to invite an increment in leakage current, and in the worst case, it results in a short.

On the other hand, audio-video devices and automotive electronics need increasingly a higher reliability, so that the solid electrolytic capacitor should improve the performance of small leakage current and also the anti-short properties in addition to the advantages of small in size, great in capacity, and low ESR. To meet those needs, a hybrid electrolytic capacitor has been proposed, namely, electrolyte solution is used together with solid electrolytic material such as conductive polymer, because the electrolyte solution is excellent in recovery action at a failure of the anodic oxide film working as dielectric.

FIG. 4 is a sectional view illustrating a structure of a conventional hybrid electrolytic capacitor (wound type), and FIG. 5 is an exploded perspective view of a capacitor element of this hybrid electrolytic capacitor. FIG. 6 is a sectional view illustrating schematically an essential part enlarged.

As shown in FIG. 4, this hybrid electrolytic capacitor comprises the following elements: capacitor element 2 as a functional element, a pair of lead wires 1A, 1B, and outer package 5. First ends of lead wires 1A, 1B are connected to capacitor element 2, and second ends thereof are led outside. Outer package 5 encloses capacitor element 2 and electrolyte solution (not shown) together therein.

As shown in FIG. 5 and FIG. 6, capacitor element 2 includes anode foil 2A, cathode foil 2B, and separator 2C. Anode foil 2A is made of foil of valve metal, e.g. aluminum, having undergone an etching process to roughen the surface, on which dielectric layer 2E of the anodic oxide film is formed by a chemical conversion process. Cathode foil 2B is made of valve metal such as aluminum. Anode foil 2A and cathode foil 2B are layered and wound together with separator 2C disposed therebetween.

On top of that, conductive polymer layer 6 formed of particles or aggregate of the conductive polymer such as polyethylene dioxythiophene is disposed between anode foil 2A and cathode foil 2B. This polymer layer 6 is provided on the surfaces of anode foil 2A, cathode foil 2B, and separator 2C. First ends of lead wires 1A, 1B are connected to anode foil 2A and cathode foil 2B respectively, and second ends thereof are led out from the same end face of capacitor element 2.

Outer package 5 is formed of cylindrical housing 3 having a bottom, and sealer 4. Housing 3 accommodates capacitor element 2 impregnated with electrolyte solution. Sealer 4 includes through holes 4A, 4B for lead wires 1A, 1B to run through respectively. Sealer 4 is disposed at an opening of housing 3, and a drawing process is provided to an outer wall of housing 3 to compress and deform the opening, thereby sealing the opening with the aid of sealer 4 formed of rubber packing.

SUMMARY

An electrolytic capacitor of the present invention has a capacitor element, electrolyte solution impregnated into the capacitor element, and an outer package enclosing the capacitor element together with the electrolyte solution. The capacitor element includes an anode foil, a cathode foil, a separator, and a solid electrolytic layer. The anode foil has a dielectric layer on its surface. The cathode foil confronts the anode foil, and the separator is disposed between the anode foil and the cathode foil. The solid electrolytic layer is formed of an aggregate of fine particles of conductive polymer, on the surfaces of the anode foil, cathode foil, and the separator. An air-tightness of the separator falls within the range from 0.5 s/100 ml to 2.0 s/100 ml, inclusive. Sizes of the fine particles of the conductive polymer fall within the range from 25 nm to 100 nm, inclusive. Each of the foregoing surfaces contains the fine particles of the conductive polymer at a rate falling within the range from 0.3 mg/cm$^2$ to 1.2 mg/cm$^2$, inclusive as converted to weight per unit area of the anode foil.

DETAILED DESCRIPTION OF PREFERRED EMBODIMENT

Figure 4:
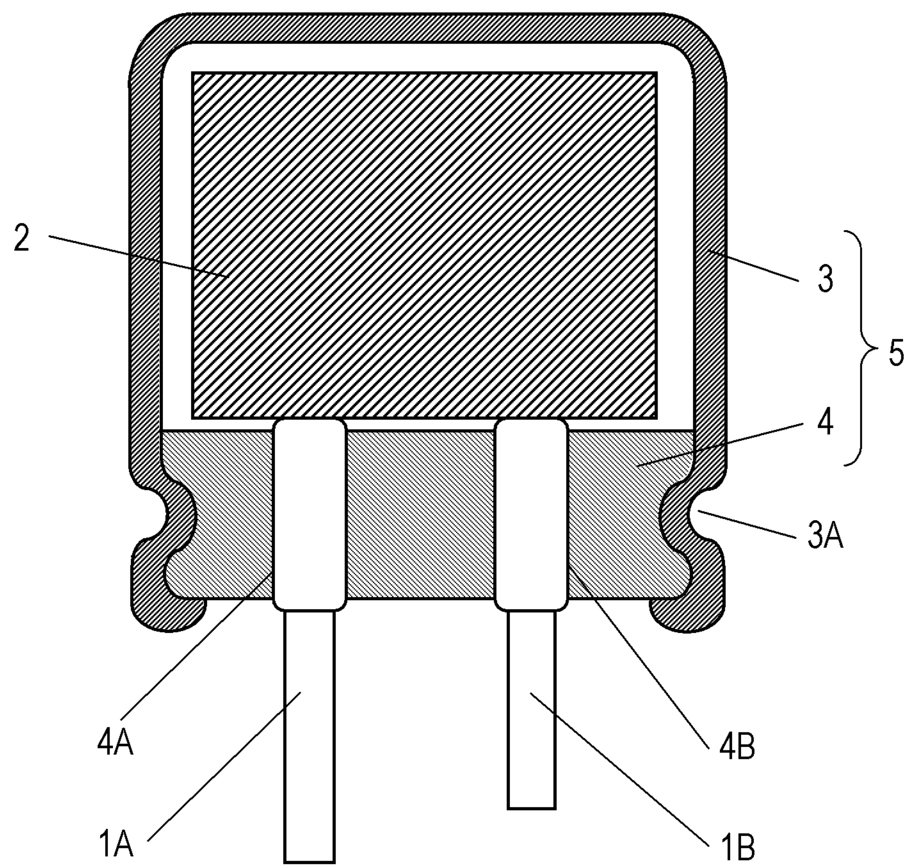
FIG. 4 is a sectional view illustrating a structure of a conventional hybrid electrolytic capacitor including a wound-type capacitor element.

Prior to the description of the exemplary embodiment of the present invention, a method of manufacturing a conventional hybrid electrolytic capacitor shown in FIG. 4 is described hereinafter.

Figure 5:
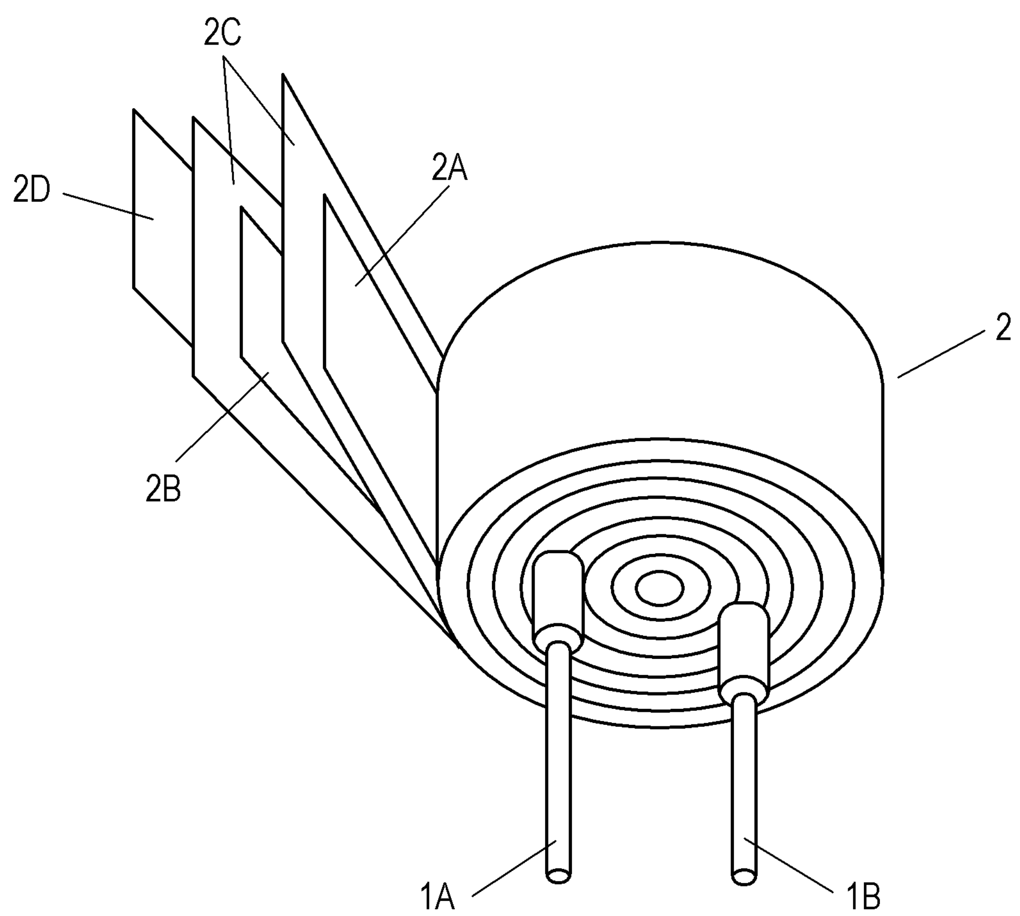
FIG. 5 is an exploded perspective view of the capacitor element shown in FIG. 4.

First, as shown in FIG. 5, prepare anode foil 2A, cathode foil 2B, and separator 2C. Anode foil 2A is formed of valve metal, e.g. aluminum, and includes dielectric layer 2E made of anodic oxide film on its surface. Then connect first ends of lead wire 1A, 1B to anode foil 2A, cathode foil 2B respectively. Next, interpose separator 2C between anode foil 2A and cathode foil 2B, and roll them together into a cylindrical shape. Then fasten the cylindrical shape with insulating tape 2D on the outer wall to form capacitor element 2.

Next, form conductive polymer layer 6 between anode foil 2A and cathode foil 2B of capacitor element 2. Conductive polymer layer 6 is formed this way: First, disperse fine particles of polyethylene dioxythiophene containing dopant agent into solvent, i.e. water, to prepare dispersions-solution, and then impregnate capacitor element 2 into this dispersions-solution in a decompressed condition. Then take out capacitor element 2 and put it into a drying oven at 125° C. to be dried.

Next, impregnate capacitor element 2 with the electrolyte solution, and put it in housing 3 made of aluminum, then place sealer 4 made of rubber packing at the opening of housing 3. Provide a drawing process around the outer wall of housing 3 to form drawn section 3A, thereby sealing the opening with the aid of sealer 4. Then apply a voltage across lead wires 1A and 1B to provide chemical conversion again (aging), so that the hybrid electrolytic capacitor is completed.

Conductive polymer layer 6 is formed this way: Prepare the dispersions-solution in advance outside capacitor element 2, and in this solution fine particles of the conductive polymer are dispersed. Then impregnate capacitor element 2 with the dispersions solution, and then remove the solvent of the solution. In other words, conductive polymer layer 6 is not formed by chemical polymerization reaction within capacitor element 2. This reaction is caused by inputting polymerization materials such as monomer, oxidizer, or dopant into capacitor element 2. To be more specific, any oxidizer cannot be used in manufacturing capacitor elements 2. As a result, dielectric layer 2E encounters less damages comparing with conductive layer 6 formed by the chemical polymerization reaction. The foregoing method also allows forming flat conductive polymer layer at a higher density over the surfaces of anode foil 2A, cathode foil 2B and separator 2C. As a result, even if dielectric layer 2E is damaged by heat, the foregoing structure allows mitigating the degree of damage, and thus the electrolyte solution can recover dielectric layer 2E at a higher probability.

On top of that, this hybrid electrolytic capacitor does not need cleaning the oxidizer remaining after the chemical polymerization reaction within capacitor element 2, so that it can eliminate a drying process accompanying the cleaning process. As a result, a simpler manufacturing can be expected.

In this hybrid electrolytic capacitor, the fine particles of conductive polymer are filled at a ratio of 5-55 volume % relative to the void volume of capacitor element 2. Maintaining this amount of the fine particles filled-in improves anti-heat properties of solder of the electrolytic capacitor, thereby extending the service life of the capacitor.

Figure 6:
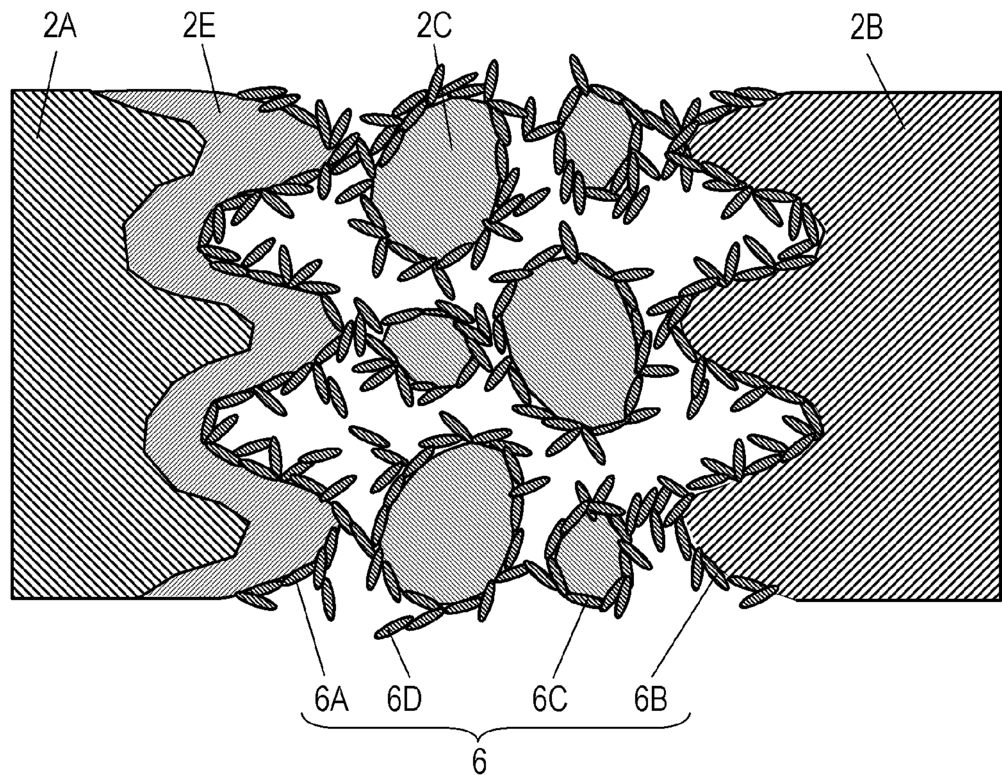
FIG. 6 is a sectional view enlarging schematically an essential part of the capacitor element shown in FIG. 4.

However, the manufacturing method discussed above cannot help producing fine particles 6D of conductive polymer in polymer layer 6 as shown in FIG. 6. Particles 6D do not involve improving the movement of electric charges between the electrode foils. Conductive polymer layer 6 includes conductive polymer fine particles (hereinafter referred to simply as particles) 6A-6D. Particles 6A are attached to the surface of anode foil 2A, particles 6B are attached to the surface of cathode foil 2B, and particles 6C are attached to the fiber surface of separator 2C. However, particles 6D branch from those surfaces and project toward voids between anode foil 2A and cathode foil 2B.

The filled amount of the particles includes a lot of loss (an amount of particles 6D), so that the productivity of the electrolytic capacitors is lowered. In other words, it is difficult to reduce an amount of the conductive polymer, and to shorten the time necessary for impregnating capacitor element 2 with the dispersions-solution. The productivity thus cannot be improved further more.

Figure 1:
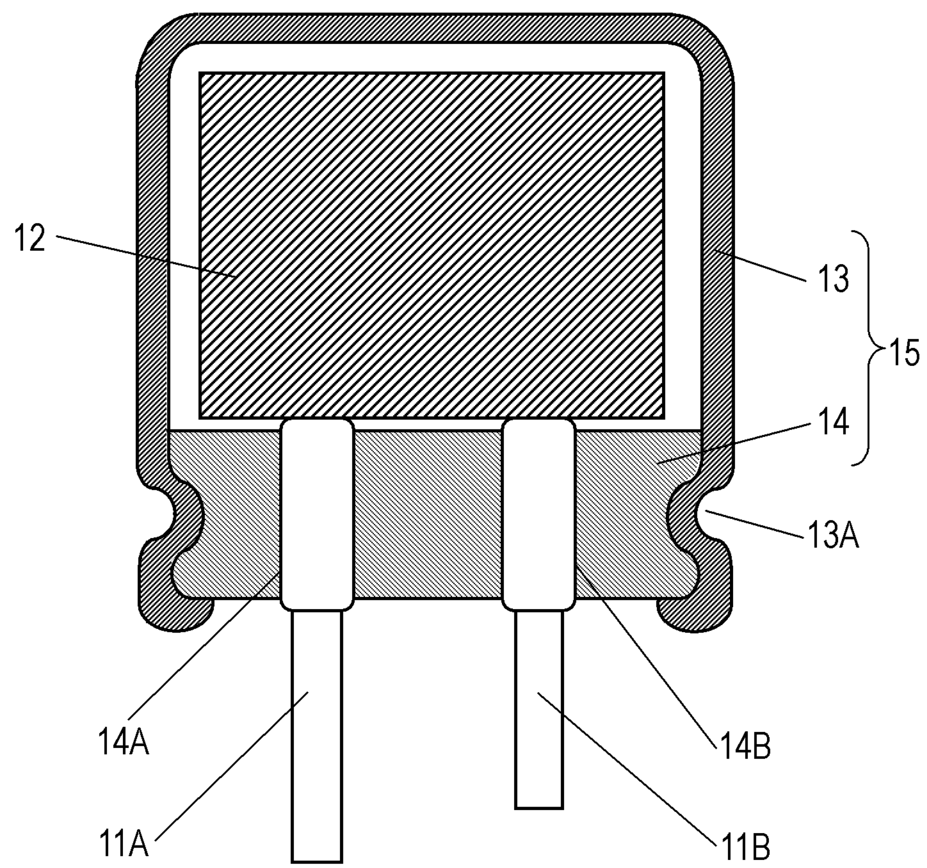
FIG. 1 is a sectional view of an example of an electrolytic capacitor in accordance with an embodiment of the present invention, and the sectional view shows a structure of a hybrid electrolytic capacitor including a wound-type capacitor element.
Figure 2:
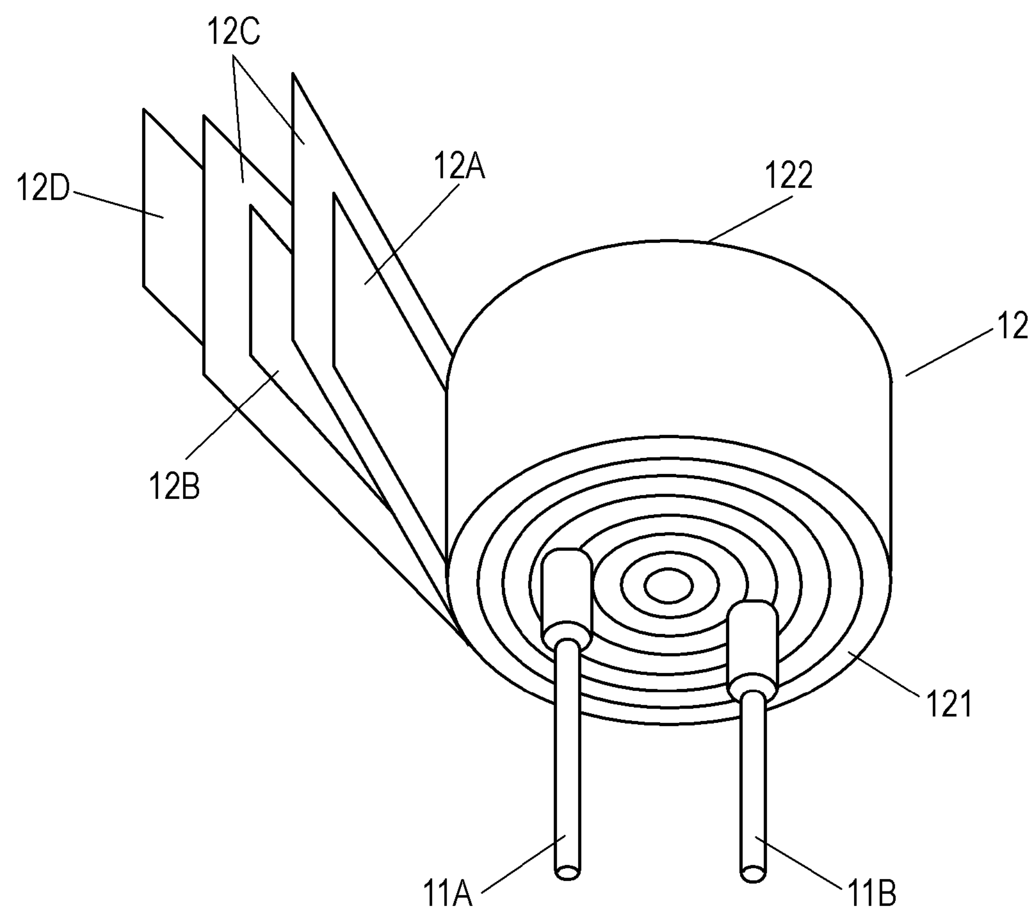
FIG. 2 is an exploded perspective view of the capacitor element shown in FIG. 1.
Figure 3:
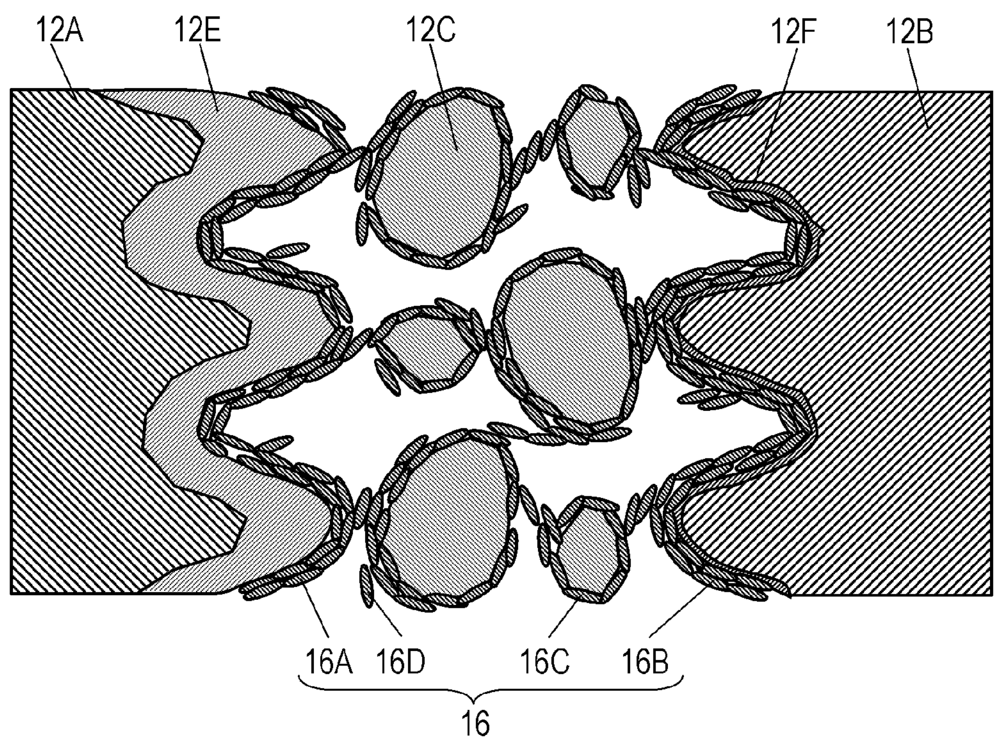
FIG. 3 is a sectional view enlarging schematically an essential part of the capacitor element shown in FIG. 1.

Hereinafter the electrolytic capacitor in accordance with the embodiment is demonstrated with reference to FIG. 1-FIG. 3. This capacitor addresses the problems discussed above. FIG. 1 is a sectional view of an example of the electrolytic capacitor in accordance with this embodiment of the present invention, and the sectional view shows a structure of a hybrid electrolytic capacitor including a wound-type capacitor element. FIG. 2 is an exploded perspective view of the capacitor element shown in FIG. 1. FIG. 3 is a sectional view enlarging schematically an essential part of the capacitor element shown in FIG. 1.

As shown in FIG. 1, the hybrid electrolytic capacitor in accordance with this embodiment comprises the following structural elements:

capacitor element 12 working as a functional element;

electrolyte solution (not shown) impregnated into capacitor element 12; and outer package 15 enclosing capacitor element 12 together with the electrolyte solution.

Capacitor element 12 is connected with leader terminals, i.e. first ends of lead wires 11A, 11B. Second ends of lead wires 11A, 11B are led outside of outer package 15.

Outer package 15 is formed of housing 13 and sealer 14. Cylindrical housing 13 having a bottom accommodates capacitor element 12 impregnated with the electrolyte solution. Sealer 14 includes through-holes 14A, 14B for lead wires 11A, 11B to run through. Sealer 14 is disposed at the opening of housing 13. An outer wall of housing 13 undergoes a drawing process to form drawn section 13A, where sealer 14 is compressed to seal the opening. Sealer 14 is formed of rubber material such as ethylene propylene rubber, isobutylene-isoprene rubber, or resin material such as epoxy resin.

As shown in FIG. 2 and FIG. 3, capacitor element 12 includes anode foil 12A, cathode foil 12B, and separator 12C. Anode foil 12A has dielectric layer 12E on its surface. Anode foil 12A is thus made by etching the foil formed of valve metal, e.g. aluminum, and roughening the surface of the foil, and then form dielectric layer 12E of anodic oxide film on the surface through chemical conversion. Cathode foil 12B confronting anode foil 12A is also made of valve metal, e.g. aluminum. Separator 12C is interposed between anode foil 12A and cathode foil 12B.

As shown in FIG. 2, anode foil 12A and cathode foil 12B are wound together with separator 12C interposed therebetween, thereby forming capacitor element 12. First ends of lead wire 11A, 11B are connected to anode foil 12A and cathode foil 12B respectively. Both of second ends thereof are led out from first end face 121 of capacitor element 12. Capacitor element 12 has first end face 121 and second end face 122 opposite to first end face 121. Capacitor element 12 can be formed by layering multiple electrode foils instead of winding the electrode foils (anode foil 12A and cathode foil 12B).

As shown in FIG. 3, between anode foil 12A and cathode foil 12B of capacitor element 12, conductive polymer layer 16 is formed. Polymer layer 16 is made of aggregate of fine particles of conductive polymer, e.g. polytiophene or its derivative. Conductive polymer layer 16 is a solid electrolytic layer formed on the surfaces of anode foil 12A, cathode foil 12B, and separator 12C. Fine particles of the conductive polymer are dispersed into solvent, whereby the particles can be handled as a dispersions-solution.

Conductive polymer layer 16 includes conductive polymer fine particles (hereinafter referred to simply as particles) 16A-16C. Particles 16A are attached to the surface of anode foil 12A, particles 16B are attached to the surface of cathode foil 12B, and particles 16C are attached to the fiber surface of separator 12C. The sizes of particles 16A-16C fall within a range from 25 nm to 100 nm (inclusive).

The sizes of particles 16A-16C are measured by this method: Apply a laser beam to the dispersions-solution, in which those particles are dispersed in the solvent, based on the dynamic light scattering method, and then observe the scattered light with a photon detector. The particle size refers to a median diameter, and it is expressed in general as "d50".

Conductive polymer layer 16 includes particles 16A, 16B, and 16C and those adjacent particles are brought into contact with each other, thereby forming paths for the electric charges to move between anode foil 12A and cathode foil 12B. Besides those particles, layer 16 includes conductive polymer fine particles (hereinafter referred to simply as particles) 16D that branch from the surfaces of anode foil 12A, cathode foil 12B, and the fiber surface of separator 12C and project toward voids between anode foil 12A and cathode foil 12B. Particles 16D are attached to each of the surfaces discussed above but they neither involve enlarging an effective area of anode foil 12A, nor relate to an improvement of the movement of the electric charges between the electrode foils.

Particles 16A-16D are made of polyaniline, polypyrrole, polytiophene, and/or their derivatives. Polyethylene dioxytiophene among others, which is a derivative of polytiophene, has a heat decomposition temperature at as high as 350° C. This property is preferable for an application that needs heat resistance in a high temperature environment. Polyethylene dioxytiophene polystylene sulfonic acid (PEDOT-PSS) is one of the preferable materials featuring high conductivity and high dielectric strength, and PEDOT-PSS contains polystylene sulfonic acid as dopant.

The fine particles of the conductive polymer can be attached to each of the surfaces generally this way: Prepare the dispersions-solution in which the fine particles are dispersed in the solvent, and impregnate capacitor element 12 with this dispersions-solution for the solution to diffuse into voids inside capacitor element 12. When this method is used, an amount of the fine particles attached inside capacitor element 12 has some relation to the electric characteristics of the electrolytic capacitor.

To be more specific, here is a relation between the amount of particles 16A-16D attached inside and an electrostatic capacity of the electrolytic capacitor. The smaller amount of particles 16A-16D attached inside capacitor element 12 decreases the electrostatic capacity gradually. When the amount of the particles attached inside reaches smaller than 0.3 mg/cm$^2$, (this value is converted to an amount per unit area of anode foil 12A), the electrostatic capacity lowers drastically, and on the other hand, the greater amount of the particles attached inside increases the electrostatic capacity gradually. However, when the amount of the particles attached inside exceeds 1.2 mg/cm$^2$, (this value is converted to an amount per unit area of anode foil 12A), the electrostatic capacity does not increase any longer. The electrostatic capacity in this context refers to an initial value measured after the aging process.

Here is another relation between the amount of particles attached inside and an ESR value of the electrolytic capacitor. The smaller amount of the particles attached inside increases the ESR value gradually, and when the amount of particles reaches smaller than 0.3 mg/cm$^2$, (this value is converted to an amount per unit area of anode foil 12A), the ESR value increases drastically. The greater amount of particles attached inside lowers the ESR value gradually, and when the amount exceeds 1.2 mg/cm$^2$, (this value is converted to an amount unit area of anode foil 12A), the ESR value does not lower any longer. The ESR value in this context refers to an initial value measured after the aging process.

The foregoing relations between the amount of particles 16A-16D attached inside capacitor element 12 and the electrical characteristics of the electrolytic capacitor determine that the amount of particles attached inside falls within a range from 0.3 mg/cm$^2$ to 0.6 mg/cm$^2$ (inclusive). Those values are converted to amounts per unit area of anode foil 12A. In other words, the lower limit of the amount is set at a critical value that does not cause a drastic change in the electrostatic capacity or the ESR value. The upper limit of the amount is set at a critical value at which the electrostatic capacity or the ESR value enters into a steady range. In other words, this critical value minimizes the amount of particles 16D that neither involve enlarging the effective area of anode foil 12A nor relate to the improvement of the movement of electric charges between the electrode foils. The unit area of anode foil 12A in this context refers to a projected area of anode foil 12A, namely, the amount per either one of the two sides of the same foil 12A.

Unexamined Japanese Patent Application Publication No. 2009-16770 discloses the amount of particles 16A-16D attached inside, namely, it is expressed as a filling factor relative to a volume of voids in the capacitor element, and the amount falls within the range from 0.96-3.85 volume %, where the volume of voids is 48 μl, and area of anode foil 12A is 2 cm$^2$, a specific gravity of particles 16A-16D is 1.3.

Separator 12C is brought into contact not only to solid conductive polymer working as electrolyte but also to electrolyte solution, so that separator 12C needs to have solvent resistant properties. For instance, chemical fiber based material employs aramid, and cellulose based material employs manila or esparto. To be more specific, separator 12C can employ non-woven fabric containing cellulose, craft, polyethylene terephthalate, polybutylene terephthalate, polyphenylene sulfide, nylon, aromatic polyamide, polyimide, polyamidimide, polyetherimide, rayon, or glassy material. The sizes of particles 16A-16D are not greater than 100 nm. A uniform dispersion of particles 16A-16D inside capacitor element 12, and stable attachment of the particles onto the surfaces of anode foil 12A, cathode foil 12B, and fiber surface of separator 12C need an air-tightness of separator 12C to fall within a range from 0.5 s/100 ml to 2.0 s/100 ml (inclusive). Use of this separator 12C having the foregoing air-tightness allows isolating anode foil 12A from cathode foil 12B so as not to touch each other, and also allows diffusing uniformly the conductive polymer fine particles dispersed in the dispersions-solution into the voids between the fibers of separator 12C.

The air-tightness of separator 12C is a value measured according to the method specified in JIS P 8117 (method of testing the air permeability and air resistance of paper and paper board). This value is obtained this way: Mount a cylinder throttle plate measuring 6 mm in diameter to B-type measuring instrument at its lower part where test piece is supposed to be mounted, and put a separator paper which is raw fabric of separator 12C onto a throttle face. Measure a time (s/100 ml) necessary for the air of 100 ml to pass through a cylindrical face, which measures 6 mm in diameter, of the separator paper.

The separator containing fibril fiber can be thinned with ease; however, it becomes denser and thus tends to have a higher air-tightness. This material is not preferable because it prevents the conductive polymer fine particles from diffusing uniformly in the dispersions-solution. It is preferable to employ a separator formed of fibers not containing the fibers of which diameters are not greater than 0.1 μm and lengths are not greater than 10 μm. It is more preferable to employ a separator formed of only long fibers of which diameters fall within the range from 1-50 μm, and having an aspect ratio of 100-50000.

The electrolyte solution is prepared by solving a solute in a solvent. The material for the solvent can be γ-butyro-lacton, ethylene glycol, or sulfolane. In the case of hybrid electrolytic capacitor, a value of the inter-electrode resistance between anode foil 12A and cathode foil 12B largely depends on the conductivity of conductive polymer layer 16, and little depends on the conductivity of the electrolyte solution. The electrolytic capacitor generally employs solely the electrolyte solution as electrolyte, and this capacitor cannot employ a large amount of polyethylene glycol as solvent; however, as discussed above, the electrolytic capacitor of the present invention can employ the polyethylene glycol. In this case, the solute includes, e.g. inorganic acid ammonium salt, inorganic acid amine salt, inorganic acid alkyl substitution amidine salt or its quaternized products, organic ammonium salt, organic acid amine salt, organic acid alkyl substitution amidine salt or its quaternized products.

The electrolyte solution can contain appropriate additives for absorbing gas, stabilizing dielectric strength, adjusting pH, and preventing oxidation. For instance, as oxidation preventive agent, amine-based oxidation preventive agent, benzotriazole-based oxidation preventive agent, phenol-based oxidation preventive agent, phosphorous-based oxidation preventive agent are effective for capacitors. To be more specific, diphenylamine, naphtol, nitrophenol, catecol, resorcinol, hydrochinone, and pyrogallol can be used. Hydrochinone and pyrogallol among others have multiple OH groups, so that they can produce strong oxidation preventive effect.

Next, a method of manufacturing the electrolytic capacitors in accordance with the embodiment is demonstrated hereinafter. First, as shown in FIGS. 2 and 3, cut anode foil 12A, cathode foil 12B, and separator 12C at a given length and a given width. Those foils and separator have dielectric layer 12E on their surfaces. Then connect first ends of lead wires 11A, 11B to anode foil 12A, cathode foil 12B respectively by crimping or using ultrasonic wave. Interpose separator 12C between anode foil 12A and cathode foil 12B, and roll them together into a cylindrical shape. Then fasten the cylindrical shape at its outer wall with insulating tape 12D to form a precursor of a capacitor element. This precursor looks like capacitor element 12 shown in FIG. 2.

The surface of anode foil 12A has undergone an etching process or an evaporation of metal particles, so that the surface area is increased. Dielectric layer 12E is obtained this way: Prepare valve metal such as aluminum as electrode material, and provide the valve metal with anodic oxidation to obtain an anodic oxide film. Here is another way: The metal foil of anode foil 12A undergoes evaporation or application of the valve metal.

The surface of cathode foil 12B undergoes, when necessary, the surface treatment such as etching, oxide film, evaporation of metal particles, or attachment of conductive particles of, e.g. carbon.

Then dip the precursor of capacitor element into a chemical conversion solution, and apply a voltage to lead wires 11A, 11B, thereby recovering and chemically converting the oxide film on the surface of anode foil 12A.

Next, as shown in FIG. 1, insert lead wires 11A, 11B led out from the precursor into through-holes 14A, 14B provided to sealer 14, and then, mount sealer 14 to the precursor. Sealer 14 can be mounted to the precursor before dipping it in the chemical conversion solution.

Then as shown in FIG. 3, form conductive polymer layer 16 between anode foil 12A and cathode foil 12B of the precursor of capacitor element. First, prepare the dispersions-solution in which the fine particles of conductive polymer are dispersed in the solvent. Impregnate the precursor of capacitor element with this dispersions-solution so that the dispersions-solution can permeate through the inside of the precursor.

Impregnate the capacitor element 12 with the dispersions-solution preferably this way: Place the precursor of capacitor element horizontally with its second end face 122 facing upward, then drop the dispersions-solution onto second end-face 122. This method prevents variation in the amount of dispersions-solution impregnated into the precursor, so that a stable amount of particles 16A-16D attached inside the precursor can be maintained.

Decompress the air pressure around the precursor impregnated with the dispersions-solution, and then restore the pressure to the atmospheric pressure. This change in air pressure will promote the permeation of the dispersions-solution through the precursor.

Next, heat the precursor impregnated with the dispersions-solution to reduce the amount of solvent, so that particles 16A-16D aggregate and they attach filmily to the surfaces of anode foil 12A and cathode foil 12B, and the fiber surface of separator 12C. Capacitor element 12 is thus formed. In this case, prepare the dispersions-solution such that the amount of particles 16A-16D attached should fall within the range from 0.3 mg/cm$^2$ to 1.2 mg/cm$^2$ (inclusive), where these values are converted into amounts per unit area of anode foil 12A. To be more specific, the density of the dispersions-solution is adjusted.

To increase the productivity, it is preferable to attach a given amount of conductive polymer fine particles in one-time impregnation process. To achieve this one-time impregnation, the fine particles can be dispersed in the solvent at a density falling within the range from 1.25 wt % to 2.8 wt % (inclusive), and the particle sizes should fall within the range from 25 nm to 100 nm (inclusive).

Next, accommodate capacitor element 12 together with the electrolyte solution into housing 13, and place sealer 14 at the opening of housing 13. Impregnate capacitor element 12 with the electrolyte solution this way: Put a given amount of the electrolyte solution in housing 13 in advance, and accommodate capacitor element 12 in housing 13 while the electrolyte solution impregnates into capacitor element 12. Here is another way: Dip capacitor element 12 into a bath storing the electrolyte solution, and then take out capacitor element 12 from the bath before it is accommodated in housing 13. If necessary, a degree of vacuum around the bath can be adjusted. An electrolyte solution surplus to the impregnation can be held in housing 13.

Next, provide a drawing process around the outer wall of housing 13 to form drawn section 13A, thereby sealing the opening with the aid of sealer 4. Meanwhile outer package 15 employs insulating resin such as epoxy resin for the package to cover capacitor element 12, and the second ends of lead wires 11A, 11B can be led outside this package.

An insulating plate (not shown) having a pair of through-holes can be placed adjacently to the opening of housing 13. In this case, the second ends of lead wires 11A, 11B led out from the outer face of sealer 14, which seals the opening of housing 13, are inserted into the through-holes of the insulating plate. Then lead wires 11A, 11B are bent oppositely to each other at approx. right angles to be accommodated in grooves (not shown) provided to the outer surface of the insulating plate. A surface-mount type electrolytic capacitor can be thus completed.

After sealing the opening of housing 13 or after mounting the insulating plate to the opening, a voltage can be applied appropriately between lead wires 11A and 11B to carry out the chemical conversion again.

As discussed above, the electrolytic capacitor in accordance with this embodiment has the following specifications: an air-tightness of separator 12C falls within the range from 0.5 s/100 ml to 2.0 s/100 ml (inclusive), sizes of particles 16A-16D fall within the range from 25 nm to 100 nm (inclusive), a content of particles 16A-16D falls within the range from 0.3 mg/cm$^2$ to 1.2 mg/cm$^2$ (inclusive and these values are converted into amounts per unit area of anode foil 12A). In this capacitor, particles 16A-16C are attached to the surfaces of anode foil 12A, cathode foil 12B, and the fiber surface of separator 12C. Particles 16C attached to the fiber surface of separator 12C work as the paths for the electric charges to move between the surface of anode foil 12A and the surface of cathode foil 12B. The foregoing specifications can minimize the amount of particles 16D attached inside capacitor element 12. Particles 16D branch toward the voids inside capacitor element 12, e.g. between fibers of separator 12C. This minimization allows reducing a loss amount of conductive polymer. As a result, the foregoing specifications achieve the electrolytic capacitor of smaller in size, greater in capacity, lower ESR, smaller leakage current, and greater dielectric strength.

Particles 16A-16C maintain their bead shape with the aid of electrostatic repulsion while they are dispersed in the solvent of the dispersions-solution. However, when the amount of solvent is decreased, the electrostatic repulsion becomes weaker, so that the bead shape changes into flat shape. In the case of forming a film by aggregating the fine particles of conductive polymer, an excessively great size of the fine particles thus adversely affects the orientation of the fine particles, and this excessively great size becomes a factor of preventing the film formation.

To avoid the foregoing problem, the sizes of particles 16A-16C are regulated to be not greater than 100 nm. This specification allows the fine particles of conductive polymer to aggregate and to attach to the surface of anode foil 12A, cathode foil 12B, and the fiber surface of separator 12C to attach onto those surfaces as a flat film. This specification also regulates the production of particles 16D that branch from the surfaces of anode foil 12A, cathode foil 12B, and the fiber surface of separator 12C and project toward voids between anode foil 12A and cathode foil 12B.

Fine etching pits exist on the surface of anode foil 12A. The etching pit generally measures 100-200 nm in diameter. It is thus preferable for the film formed of aggregated particles 16A to enter into the etching pits in order to form the film uniformly and flat on the surface of anode foil 12A. Since the size of particles 16A is regulated to be not greater than 100 nm, particles 16A can enter into the etching pits, so that the electrostatic capacity can be increased and the ESR can be lowered.

The electrolytic capacitor sometimes needs heat resistance to reflow-soldering of 200° C. or higher, or needs a long-term heat resistance in a high temperature environment where the maximum operating temperature exceeds 105° C. In such a case, thermal stress produces oxidation-degradation or heat shrinkage in the film formed of the aggregated fine particles of conductive polymer which forms polymer layer 16. In the hybrid electrolytic capacitor, the electrolyte solution covers the surface of conductive polymer layer 16, so that this structure can mitigate the thermal stress. However, a too small amount of particles 16A-16D attached cannot allow the electrolyte solution to mitigate the thermal stress, and results in lowering the electric characteristics of the electrolytic capacitor. On top of that, when the electrolyte solution decreases, the electric characteristics remarkably lower. It is thus preferable to determine the lower limit of the amount of particles 16A-16D attached in order to improve not only the initial characteristics but also the reliability of the heat resistance to the reflow-soldering and the reliability of the long-term heat resistance. To be more specific, the content of the particles is preferably not smaller than 0.4 mg/cm$^2$ per unit area of anode foil 12A. This specification allows the particles in polymer layer 16 to resist against the thermal stress, and maintains steadily the electric characteristics of the electrolytic capacitor.

The method of manufacturing the electrolytic capacitor in accordance with the embodiment of the present invention employs the dispersions-solution in which the fine particles of conductive polymer are dispersed in the solvent, and thus attaches the fine particles onto the surface of anode foil 12A and the like. In this method, a condition for the precursor of the capacitor element is determined that separator 12C should have the air-tightness falling within the range from 0.5 s/100 ml to 2.0 s/100 ml (inclusive), and a condition for the dispersions-solution is determined that the sizes of the particles fall within the range from 25 nm to 100 nm (inclusive), and the particle density should be not greater than 2.8 wt %. Those conditions allow the fine particles of conductive polymer to diffuse uniformly in the precursor of the capacitor element.

After preparing the foregoing conditions, as the solvent of the dispersions-solution is decreased, the fine particles aggregate and form a uniform and flat film as conductive polymer layer 16 on the surfaces of anode foil 12A cathode foil 12B, and the fiber surface of separator 12C. Then adjust the impregnating conditions such as the amount of dispersions-solution to be impregnated into the precursor, and determine how many times the impregnation processes should be done. Those preparations allow the amount of the fine particles attached inside to fall within the range from 0.3 mg/cm$^2$ to 1.2 mg/cm$^2$ (inclusive and these values are converted into amounts per unit area of anode foil 12A). As a result, these preparations can minimize the loss amount of the fine particles to be attached, namely, the amount of fine particles, which branch and project toward the voids inside capacitor element 12 and do not involve the movement of the electric charges, can be minimized. As a result, a minimum amount of particles attached inside can be maintained for stabilizing the initial electric characteristics of the electrolytic capacitor.

It is preferable to determine that the amount of the fine particles attached inside should fall within the range from 0.4 mg/cm$^2$ to 1.2 mg/cm$^2$ (inclusive). This specification allows obtaining sufficiently the fine particles, resisting to the thermal stress at a high temperature, of the conductive polymer. As a result, the electrolytic capacitor can maintain the electric characteristics steadily.

A higher density than 2.8 wt % of the fine particles of conductive polymer in the dispersions-solution will prevent the uniform diffusion of the fine particles into the precursor of the capacitor element. During the film formation while the solvent is decreased, the film thus becomes uneven, which results in degradation of the electric characteristics.

A lower density than 1.2 wt % of the fine particles in the dispersions-solution will not allow the one-time impregnation to attach the fine particles to the surfaces in an amount greater than 0.3 mg/cm$^2$ per unit area of anode foil 12A even if the maximum volume of the dispersions-solution is input into the precursor of the capacitor element.

It is thus preferable to employ the dispersions-solution of which density of the fine particles of conductive polymer falls within the range from 1.2 wt % to 2.8 wt % (inclusive). Use of this solution allows one-time operation of a series of processes including the impregnation into capacitor element 12, removing the solvent fir the fine particles of conductive polymer to attach to the surfaces of anode foil 12A, cathode foil 12B, and the fiber surface of separator 12C. The amount of the fine particles attached falls within the range from 0.3 mg/cm$^2$ to 0.67 mg/cm$^2$ (inclusive and these values are converted to amounts per unit area of anode foil 12A). As a result, capacitor element 12 can be sealed together with the electrolyte solution in outer package 15, whereby the electrolytic capacitor having excellent electric characteristics can be manufactured efficiently.

A lower limit of the density of the conductive polymer fine particles can be determined at 1.67 wt %, and then a lower limit of the amount of the fine particles attached inside can be regulated in an amount not smaller than 0.4 mg/cm$^2$ (this value is converted into an amount per unit area of anode foil 12A). As a result, conductive polymer layer 16 resisting to the thermal stress at a high temperature can be formed, so that the electrolytic capacitor of extremely reliable in the heat resistance to the reflow soldering and in the long-term heat resistance.

When the solvent of the dispersions-solution contains polar organic dispersing agent, the flatness of the film, formed of the fine particles of conductive polymer and covering the surfaces of anode foil 12A, cathode foil 12B, and the fiber surface of separator 12C, can be improved. The better flatness of the film will increase the electric conductivity of the film per se, and reduce the loss amount of attached particles that do not involve the movement of electric charges. These attached particles branch from the electrode foil surfaces and the fiber surface of the separator and project toward the voids. The polar organic dispersing agent specifically refers to ethylene glycol. Since the ethylene glycol is widely used as a chief dispersing agent of the electrolyte solution of electrolytic capacitors, use of this agent is preferable because it affects little the quality of electrolytic capacitors.

However, too much amount of the polar organic dispersing agent will increase the viscosity of the dispersions-solution, so that the impregnation into the capacitor element is lowered. To the contrary, too little amount of the polar organic dispersing agent will not produce the advantage discussed above. A content of the polar organic dispersing agent preferably ranges from 1 wt % to 50 wt % (inclusive).

The structure discussed above uses lead-wires 11A and 11B to form terminals that connect capacitor element 12 to the outside; however, the present invention is not limited to this structure. For instance, the present invention is applicable to a tabless structure. In the tabless structure, an anode foil and a cathode foil expose their ends, and then the foils are wound together to form a capacitor element, so that the anode foil and the cathode foil are exposed from an upper and a lower end of the capacitor element. Those exposed sections are electrically connected to a terminal plate disposed at a sealer and to an inner bottom of the housing.

The advantages of the embodiment are described hereinafter with specific experiments.

Sample E1

Sample E1 of the electrolytic capacitor in accordance with the embodiment is prepared as follows: Sample E1 forms a hybrid electrolytic capacitor and includes a wound-type capacitor element. The specification is this: rated voltage=35V, initial electrostatic capacity=33 μF (tolerance ±20%), diameter=6.3 mm, height=5.8 mm, guaranteed service life under high temperature load=5000 hours at 105° C.

First, as shown in FIG. 2, form the dielectric layer 12E on the surface of anode foil 12A made of aluminum foil, where dielectric layer 12E is made of aluminum oxide layer. Then cut anode foil 12A, cathode foil 12B, and separator 12C at a given width and length. Connect first ends of lead wires 11A, 11B to anode foil 12A and cathode foil 12B respectively by a needle crimping method. Then interpose separator 12C between anode foil 12A and cathode foil 12C, and roll them together into a cylindrical shape. Fasten an outer wall of the cylindrical shape with insulating tape 12D, whereby the precursor of capacitor element is formed.

The foregoing procedure is detailed hereinafter. Anode foil 12A employs aluminum foil of which purity is not lower than 99.99%, and this aluminum foil undergoes an etching process to enlarge the surface area, and then undergoes an anodic oxidation process (chemical conversion voltage at 60V) for forming dielectric layer 12E made of anodic oxidation film as shown in FIG. 3. Then cut anode foil 12A into squares such that each of the squares has a projected area of 2.0 cm$^2$.

Cathode foil 12B made of aluminum foil, of which purity is not lower than 99.99%, is employed and this aluminum foil undergoes an etching process to enlarge the surface area, and then undergoes an anodic oxidation process (chemical conversion voltage at 2V) for forming aluminum oxide layer 12F thinner than layer 12E as shown in FIG. 3. Then cut cathode foil 12B into squares such that each of the squares has a given projected area opposed to anode foil 12A.

Separator 12C employs mixed paper (material A) of manila and esparto. This mixed paper has a thickness of 50 μm, density of 0.35 g/cm$^2$, and air-tightness of 2.0 s/100 ml. Cut this material A into a size having a given area that can prevent the contact between anode foil 12A and cathode foil 12B, whereby separator 12C can be prepared. Material A is formed of long fibers that include no fine fiber having undergone a fibril process.

Next, penetrate lead wires 11A, 11B led out from the precursor of the capacitor element respectively through-holes 14A, 14B provided to sealer 14 made of rubber packing, and mount sealer 4 to the precursor.

Then recover a failure at dielectric layer 12E of anode foil 12A, and then dip the precursor into chemical conversion solution for the precursor to undergo the chemical conversion process in order to form dielectric layer 12E on anode foil 12A at places vacant of layer 12E. To be more specific, apply a voltage of 60V to lead wires 11A, 11B for 10 minutes, and dry the precursor of capacitor element at 105° C. for 30 minutes.

Next, as shown in FIG. 3, form conductive polymer layer 16 between anode foil 12A and cathode foil 12B of the precursor. First, prepare the dispersions-solution in which fine particles of the conductive polymer have been dispersed in a solvent which is made of mixed solvent of water and ethylene glycol, and the weight of ethylene glycol (EG) should be not greater than 50 wt % of the total weight of the dispersions-solution.

The fine particles of conductive polymer employ PEDOT-PSS, and the particle size measures 50 nm in diameter. Adjust the particle density in the dispersions-solution at 2.0 wt %. Then adjust an amount of the dopant such that the electric conductivity of the fine particles can be measured 200 S/cm, which can be measured this way: the dispersions-solution is dropped on a flat plate to form a sheet-like film before the measurement.

Then impregnate the precursor of capacitor element with the dispersions-solution in an amount of 28.8 μl so that the solution can permeate the precursor entirely. Before the impregnation, place the precursor horizontally such that second end-face 122 can face upward, and then drop the dispersions-solution onto second end-face 122.

Next, decompress the air pressure around the precursor impregnated with the dispersions-solution down to 60 mmHg (7999.2 PA), and restore the pressure to the atmospheric pressure, i.e. 760 mmHg (101325 PA), thereby producing a pressure change for the dispersions-solution to permeate deeper the precursor.

Then heat the precursor impregnated with the dispersions-solution at 100-150° C. for approx. 60 minutes to reduce the solvent. This heating process allows the fine particles of conductive polymer to aggregate and attach filmily onto the surfaces of anode foil 12A, cathode foil 12B, and the fiber surface of separator 12C. As a result, the volume of the attached fine particles amounts to 0.3 mg/cm$^2$ (this value is converted to an amount per unit area of anode foil 12A). Capacitor element 12 is thus formed.

On the other hand, prepare the electrolyte solution, and put it into housing 13 made of aluminum and having a bottom. An amount of the electrolyte solution to be input is determined considering the following relations: a relation between a design life and a speed at which the solution permeates and diffuses outside through sealer 14, and a relation between a volume of voids inside housing 13 and a volume expansion of the electrolyte solution in a high-temperature environment during the reflow soldering.

The electrolyte solution contains ethyl-dimethyl amine salt phthalate as the solution, and includes γ-butyro-lacton, sulfolane as the solvent in addition to polyethylene glycol (molecular weight=300). Since the polyethylene glycol is hard to volatile, it does not volatile but remains after a long-term use of the electrolytic capacitor under high-temperature operation, e.g. 85-150° C. The electrolyte solution thus can maintain the recovering properties from failures at the dielectric oxide film (dielectric layer 12E).

Next, insert capacitor element 12 into housing 13 to impregnate capacitor element 12 with the electrolyte solution, and place sealer 14 mounted to capacitor element 12 at the opening of housing 13. Draw an outer wall of housing 13 around the opening to form drawn section 13A, so that sealer 14 made of elastic rubber can generate compression stress for sealing the opening of housing 13.

Then apply a voltage of 40 V between lead wires 11A and 11B for 60 minutes to provide a chemical conversion again. Sample E1 of the electrolytic capacitor is thus completed.

Samples E2-E4 and samples C1, C2 have different amounts of the conductive polymer fine particles attached per unit area of anode foil 12A from that of sample E1. Samples E5, E6 and C3, C4 have different average sizes of the fine particles from that of sample E2. Samples E7-E11 and C5, C6 have different densities of the fine particles in the dispersions-solution and different amounts of the impregnated dispersions-solution from those of sample E2. Sample E12 employs different solvent in the dispersions-solution from that of sample E2. Sample E13, C7-C9 employ a different air-tightness of separator 12C from that of sample E2. Sample C10 employs no electrolyte solution relative to the structure of sample E4. The foregoing samples E2-E13 and C1-C10 are detailed hereinafter.

Sample E2

In sample E2, an amount of the disperses-solution to be used when conductive polymer layer 16 is formed inside the precursor of capacitor element is changed from that of sample E1, namely, the amount is increased to 38.4 μl. As a result, the fine particles of conductive polymer attached inside the precursor amount to 0.4 mg/cm$^2$ (this value is converted to an amount per unit area of anode foil 12A). The other structures remain the same as those of sample E1, and the hybrid electrolytic capacitor having a rated voltage of 35V and an initial electrostatic capacity of 33 μF is prepared.

Sample E3

In sample E3, an amount of the disperses-solution to be used when conductive polymer layer 16 is formed inside the precursor of capacitor element is changed from that of sample E1, namely, the amount is increased to 76.6 μl. Since the volume of voids in the precursor is 48 μl, the series operation of impregnation process and the heating process is repeated twice, and as a result, the fine particles of conductive polymer attached inside the precursor amount to 0.8 mg/cm$^2$ (this value is converted to an amount per unit area of anode foil 12A). The other structures remain the same as those of sample E1, and the hybrid electrolytic capacitor having a rated voltage of 35V and an initial electrostatic capacity of 33 μF is prepared.

Sample E4

In sample E4, an amount of the disperses-solution to be used when conductive polymer layer 16 is formed inside the precursor of capacitor element is changed from that of sample E1, namely, the amount is increased to 115.0 μl. Since the volume of voids in the precursor is 48 μl, the series operation of impregnation process and the heating process is repeated three times, and as a result, the fine particles of conductive polymer attached inside the precursor amount to 1.2 mg/cm$^2$ (this value is converted to an amount per unit area of anode foil 12A). The other structures remain the same as those of sample E1, and the hybrid electrolytic capacitor having a rated voltage of 35V and an initial electrostatic capacity of 33 μF is prepared.

Sample C1

In sample C1, an amount of the disperses-solution to be used when conductive polymer layer 16 is formed inside the precursor of capacitor element is changed from that of sample E1, namely, the amount is decreased to 19.1 μl. As a result, the fine particles of conductive polymer attached inside the precursor amount to 1.6 mg/cm$^2$ (this value is converted to an amount per unit area of anode foil 12A). The other structures remain the same as those of sample E1, and the hybrid electrolytic capacitor having a rated voltage of 35V and an initial electrostatic capacity of 33 μF is prepared.

Sample C2

In sample C2, an amount of the disperses-solution to be used when conductive polymer layer 16 is formed inside the precursor of capacitor element is changed from that of sample E1, namely, the amount is increased to 153.0 μl. Since the volume of voids in the precursor is 48 μl, the series operation of impregnation process and the heating process is repeated four times, and as a result, the fine particles of conductive polymer attached inside the precursor amount to 1.6 mg/cm$^2$ (this value is converted to an amount per unit area of anode foil 12A). The other structures remain the same as those of sample E1, and the hybrid electrolytic capacitor having a rated voltage of 35V and an initial electrostatic capacity of 33 μF is prepared.

Sample E5

In sample E5, an average particle size of the fine particles of conductive polymer dispersed in the dispersions-solution is changed from that of sample E2. This dispersions-solution is used when conductive polymer layer 16 is formed inside the precursor of capacitor element of sample E5. The average particle size of sample E5 measures 25 nm in diameter. The other structures remain the same as those of sample E2, and the hybrid electrolytic capacitor having a rated voltage of 35V and an initial electrostatic capacity of 33 μF is prepared.

Sample E6

In sample E6, an average particle size of the fine particles of conductive polymer dispersed in the dispersions-solution is changed from that of sample E2. This dispersions-solution is used when conductive polymer layer 16 is formed inside the precursor of capacitor element of sample E6. The average particle size of sample E6 measures 100 nm in diameter. The other structures remain the same as those of sample E2, and the hybrid electrolytic capacitor having a rated voltage of 35V and an initial electrostatic capacity of 33 μF is prepared.

Sample C3

In sample C3, an average particle size of the fine particles of conductive polymer dispersed in the dispersions-solution is changed from that of sample E2. This dispersions-solution is used when conductive polymer layer 16 is formed inside the precursor of capacitor element of sample C3. The average particle size of sample C3 measures 150 nm in diameter. The other structures remain the same as those of sample E2, and the hybrid electrolytic capacitor having a rated voltage of 35V and an initial electrostatic capacity of 33 μF is prepared.

Sample C4

An average size of the fine particles dispersing in dispersions-solution used in sample C4 is changed from that of sample E2. This solution is used when conductive polymer layer 16 is formed inside the precursor of capacitor element. The average particle size of sample C4 is changed to 10 nm. The other structures remain the same as those of sample E2, and the hybrid electrolytic capacitor having a rated voltage of 35V and an initial electrostatic capacity of 33 μF is prepared.

Sample E7

In sample E7, a density of the fine particles in dispersions-solution is changed from that of sample E2. This solution is used when conductive polymer layer 16 is formed inside the precursor of capacitor element. The density of sample E7 is changed to 1.25 wt %. An amount of the dispersions-solution is also changed, namely, one-time impregnation can fill all the voids of the precursor with the solution of 48 μl. As a result, the fine particles of conductive polymer attach to the inside of precursor in an amount of 0.3 mg/cm$^2$ (this value is converted to an amount per unit area of anode foil 12A). The other structures remain the same as those of sample E2, and the hybrid electrolytic capacitor having a rated voltage of 35V and an initial electrostatic capacity of 33 μF is prepared.

Sample E8

In sample E8, a density of the fine particles in dispersions-solution is changed from that of sample E2. This solution is used when conductive polymer layer 16 is formed inside the precursor of capacitor element. The density of sample E8 is changed to 1.67 wt %. An amount of the dispersions-solution is also changed, namely, one-time impregnation can fill all the voids of the precursor with the solution of 48 μl. As a result, the fine particles of conductive polymer attach to the inside of precursor in an amount of 0.4 mg/cm$^2$ (this value is converted to an amount per unit area of anode foil 12A). The other structures remain the same as those of sample E2, and the hybrid electrolytic capacitor having a rated voltage of 35V and an initial electrostatic capacity of 33 μF is prepared.

Sample E9

In sample E9, a density of the fine particles in dispersions-solution remains unchanged from that of sample E2. This solution is used when conductive polymer layer 16 is formed inside the precursor of capacitor element. Namely the density of sample E9 is thus maintained at 2.0 wt %. An amount of the dispersions-solution is changed, namely, one-time impregnation can fill all the voids of the precursor with the solution of 48 μl. As a result, the fine particles of conductive polymer attach to the inside of precursor in an amount of 0.48 mg/cm$^2$ (this value is converted to an amount per unit area of anode foil 12A). The other structures remain the same as those of sample E2, and the hybrid electrolytic capacitor having a rated voltage of 35V and an initial electrostatic capacity of 33 μF is prepared.

Sample E10

In sample E10, a density of the fine particles in dispersions-solution is changed from that of sample E2. This solution is used when conductive polymer layer 16 is formed inside the precursor of capacitor element. Namely the density of sample E10 is changed to 2.5 wt %. An amount of the dispersions-solution is also changed, namely, one-time impregnation can fill all the voids of the precursor with the solution of 48 μl. As a result, the fine particles of conductive polymer attach to the inside of precursor in an amount of 0.6 mg/cm$^2$ (this value is converted to an amount per unit area of anode foil 12A). The other structures remain the same as those of sample E2, and the hybrid electrolytic capacitor having a rated voltage of 35V and an initial electrostatic capacity of 33 μF is prepared.

Sample E11

In sample E11, a density of the fine particles in dispersions-solution is changed from that of sample E2. This solution is used when conductive polymer layer 16 is formed inside the precursor of capacitor element. The density of sample E11 is changed to 2.8 wt %. An amount of the dispersions-solution is also changed, namely, one-time impregnation can fill all the voids of the precursor with the solution of 48 μl. As a result, the fine particles of conductive polymer attach to the inside of precursor in an amount of 0.67 mg/cm$^2$ (this value is converted to an amount per unit area of anode foil 12A). The other structures remain the same as those of sample E2, and the hybrid electrolytic capacitor having a rated voltage of 35V and an initial electrostatic capacity of 33 μF is prepared.

Sample C5

A density of the fine particles dispersing in dispersions-solution used in sample C5 is changed from that of sample E2. This solution is used when conductive polymer layer 16 is formed inside the precursor of capacitor element. The density of sample C5 is changed to 0.83 wt %. An amount of the dispersions-solution is also changed, namely, one-time impregnation can fill all the voids of the precursor with the solution of 48 μl. As a result, the fine particles of conductive polymer attach to the inside of precursor in an amount of 0.2 mg/cm$^2$ (this value is converted to an amount per unit area of anode foil 12A). The other structures remain the same as those of sample E2, and the hybrid electrolytic capacitor having a rated voltage of 35V and an initial electrostatic capacity of 33 μF is prepared.

Sample C6

A density of the fine particles in dispersions-solution used in sample C6 is changed from that of sample E2. This solution is used when conductive polymer layer 16 is formed inside the precursor of capacitor element. The density of sample C6 is changed to 3.3 wt %. An amount of the dispersions-solution is also changed, namely, one-time impregnation can fill all the voids of the precursor with the solution of 48 μl. As a result, the fine particles of conductive polymer attach to the inside of precursor in an amount of 0.8 mg/cm$^2$ (this value is converted to an amount per unit area of anode foil 12A). The other structures remain the same as those of sample E2, and the hybrid electrolytic capacitor having a rated voltage of 35V and an initial electrostatic capacity of 33 μF is prepared.

Sample E12

The solvent of dispersions-solution of sample E12 is changed from that of sample E2, namely, sample E12 uses only water as the solvent. This dispersions-solution is used when conductive polymer layer 16 is formed inside the precursor of capacitor element. The other structures remain the same as those of sample E2, and the hybrid electrolytic capacitor having a rated voltage of 35V and an initial electrostatic capacity of 33 μF is prepared.

Sample C7

Separator 12C of sample C7 is changed from that of sample E2, namely it is made of mixed paper (material B) of hemp and special rayon, and has a thickness of 50 μm, density of 0.35 g/cm$^2$, and air-tightness of 6.2 s/100 ml. Material B contains fine fibers having undergone the fibril process. The other structures remain the same as those of sample E2, and the hybrid electrolytic capacitor having a rated voltage of 35V and an initial electrostatic capacity of 33 μF is prepared.

same as those of sample E2, and the hybrid electrolytic capacitor having a rated voltage of 35V and an initial electrostatic capacity of 33 μF is prepared.

Sample C9

Separator 12C of sample C9 employs mixed paper made of material E different from material A used in sample E2. Material E is formed this way: An amount of long fibers in material A is adjusted to have an air-tightness of 0.1 s/100 ml, thereby forming material E. The other structures remain the same as those of sample E2, and the hybrid electrolytic capacitor having a rated voltage of 35V and an initial electrostatic capacity of 33 μF is prepared.

Sample C10

Sample C10 does not use the electrolyte solution comparing with the structure of sample E4. The other structures remain the same as those of sample E4, and a completely solid electrolytic capacitor having a rated voltage of 35V and an initial electrostatic capacity of 33 μF is prepared.

Table 1 lists the structures of samples E1-E13 and samples C1-C10.

TABLE 1

| | fine particles of conductive polymer | | dispersions-solution | | | | separator | | Availability |
|---|---|---|---|---|---|---|---|---|---|
| | Attached amount (mg/cm$^2$) | Diam. (nm) | density (wt %) | Impregnated amount (μl) | solvent | Numbers of processes | Material | Air-tightness (s/100 ml) | of Electrolyte solution |
| C1 | 0.20 | 50 | 2.00 | 19.1 | W + E | 1 | A | 2.0 | Av |
| E1 | 0.30 | 50 | 2.00 | 28.8 | W + E | 1 | A | 2.0 | Av |
| E2 | 0.40 | 50 | 2.00 | 38.4 | W + E | 1 | A | 2.0 | Av |
| E3 | 0.80 | 50 | 2.00 | 76.6 | W + E | 2 | A | 2.0 | Av |
| E4 | 1.20 | 50 | 2.00 | 115.0 | W + E | 3 | A | 2.0 | Av |
| C2 | 1.60 | 50 | 2.00 | 153.0 | W + E | 4 | A | 2.0 | Av |
| E5 | 0.40 | 25 | 2.00 | 38.4 | W + E | 1 | A | 2.0 | Av |
| E6 | 0.40 | 100 | 2.00 | 38.4 | W + E | 1 | A | 2.0 | Av |
| C3 | 0.40 | 150 | 2.00 | 38.4 | W + E | 1 | A | 2.0 | Av |
| C4 | 0.40 | 10 | 2.00 | 38.4 | W + E | 1 | A | 2.0 | Av |
| C5 | 0.20 | 50 | 0.83 | 48.0 | W + E | 1 | A | 2.0 | Av |
| E7 | 0.30 | 50 | 1.25 | 48.0 | W + E | 1 | A | 2.0 | Av |
| E8 | 0.40 | 50 | 1.67 | 48.0 | W + E | 1 | A | 2.0 | Av |
| E9 | 0.48 | 50 | 2.00 | 48.0 | W + E | 1 | A | 2.0 | Av |
| E10 | 0.60 | 50 | 2.50 | 48.0 | W + E | 1 | A | 2.0 | Av |
| E11 | 0.67 | 50 | 2.80 | 48.0 | W + E | 1 | A | 2.0 | Av |
| C6 | 0.80 | 50 | 3.30 | 48.0 | W + E | 1 | A | 2.0 | Av |
| E12 | 0.40 | 50 | 2.00 | 38.4 | W | 1 | A | 2.0 | Av |
| C7 | 0.40 | 50 | 2.00 | 38.4 | W + E | 1 | B | 6.2 | Av |
| C8 | 0.40 | 50 | 2.00 | 38.4 | W + E | 1 | C | 3.0 | Av |
| E13 | 0.40 | 50 | 2.00 | 38.4 | W + E | 1 | D | 0.5 | Av |
| C9 | 0.40 | 50 | 2.00 | 38.4 | W + E | 1 | E | 0.1 | Av |
| C10 | 1.20 | 50 | 2.00 | 115.0 | W + E | 1 | A | 2.0 | N/A |

W: water,
E: ethylene glycol

Sample C8

Separator 12C of sample C8 is changed from that of sample E2, namely, this separator 12C employs mixed paper (material C), which is formed this way: An amount of the fine fibers having undergone the fibril process is adjusted such that material C can have an air-tightness of 3.0 s/100 ml. The other structures remain the same as those of sample E2, and the hybrid electrolytic capacitor having a rated voltage of 35V and an initial electrostatic capacity of 33 μF is prepared.

Sample E13

Separator 12C of sample E13 employs mixed paper made of material D different from material A used in sample E2. Material D is formed this way: An amount of long fibers in material A is adjusted to have an air-tightness of 0.5 s/100 ml, thereby forming material D. The other structures remain the Samples E1-E13 and samples C1-C10 are prepared in a quantity of 30 respectively, and the initial electric characteristics of those samples are measured and listed in Table 2. The initial electric characteristics refer to measuring an electrostatic capacity with 120 Hz and at 20° C. and an ESR value with 100 kHz at 20° C. of each sample, and averages thereof are listed in Table 2.

Samples E1-E6 undergoes a reflow-soldering heat resistant test and a high temperature load test. The electric characteristics after these tests are measured and listed in table 2. The reflow-soldering heat resistant test is done in the following conditions: peak temperature=255° C., and the test is done at not lower than 250° C. for not longer than 10 seconds, at not lower than 230° C. for not longer than 30 seconds, not lower than 217° C. for not longer than 40 seconds, and a preheat is done at not lower than 160° C. for not longer than 120 seconds. The reflow is done twice. The high temperature load test is done this way: A rated voltage is applied to the samples at 105° C. for 5000 hours.

After the reflow-soldering heat resistant test and the high temperature load test, an electrostatic capacity and an ESR value are measured under the foregoing conditions as the electric characteristics, and the averages thereof are listed in Table 2. A rate of change from the initial characteristics is calculated and listed in Table 2.

The foregoing conditions also allows minimizing the amount of the fine particles branching toward the voids between the fibers of separator 12C, namely, the fine particles in this state do not involve improving the movement of electric charges, so that the foregoing conditions can minimize the loss amount of conductive polymer.

The hybrid electrolytic capacitors of sample E1-E4 have the fine particles of conductive polymer attached inside in an amount of not smaller than 0.4 mg/cm$^2$ (this value is converted to an amount per unit area of anode foil 12A). Even if the capacitors are left in a high temperature environment, e.g.

TABLE 2

| | Initial value | | After reflow resistant test | | | | After high temperature load test | | | |
|---|---|---|---|---|---|---|---|---|---|---|
| | Electrostatic capacity (μF) | ESR (mΩ) | Electrostatic capacity (μF) | Rate of change (%) | ESR (mΩ) | Rate of change (%) | Electrostatic capacity (μF) | Rate of change (%) | ESR (mΩ) | Rate of change (%) |
| C1 | 27.5 | 46.7 | — | — | — | — | — | — | — | — |
| E1 | 28.7 | 28.3 | 26.8 | −6.6 | 45.8 | 162.0 | 19.5 | −32.1 | 64.5 | 228.0 |
| E2 | 29.9 | 27.6 | 29.0 | −2.9 | 36.2 | 131.0 | 26.4 | −11.8 | 39.5 | 143.0 |
| E3 | 30.1 | 27.4 | 29.4 | −2.2 | 31.5 | 115.0 | 27.2 | −9.5 | 36.7 | 134.0 |
| E4 | 30.5 | 26.8 | 30.0 | −1.7 | 29.2 | 109.0 | 28.1 | −7.9 | 32.4 | 121.0 |
| C2 | 30.4 | 26.9 | — | — | — | — | — | — | — | — |
| E5 | 32.1 | 27.7 | 31.2 | −2.8 | 37.1 | 134.0 | 28.3 | −11.9 | 39.3 | 142.0 |
| E6 | 28.2 | 35.5 | 27.3 | −3.1 | 47.9 | 135.0 | 24.4 | −13.5 | 51.8 | 146.0 |
| C3 | 18.2 | 68.8 | | | | | | | | |
| C4 | 32.0 | 45.5 | | | | | | | | |
| C5 | 28.1 | 48.2 | | | | | | | | |
| E7 | 29.3 | 28.4 | | | | | | | | |
| E8 | 29.9 | 27.8 | | | | | | | | |
| E9 | 30.5 | 26.5 | | | | | | | | |
| E10 | 29.6 | 26.2 | | | | | | | | |
| E11 | 29.1 | 26.2 | | | | | | | | |
| C6 | 29.0 | 47.0 | | | | | | | | |
| E12 | 29.3 | 35.3 | | | | | | | | |
| C7 | 30.2 | 45.1 | | | | | | | | |
| C8 | 30.1 | 43.5 | | | | | | | | |
| E13 | 29.9 | 28.4 | | | | | | | | |
| C9 | Short | Short | | | | | | | | |
| C10 | 21.1 | 82.5 | | | | | | | | |

As Table 1 shows, the hybrid electrolytic capacitors represented by samples E1-E4 have the fine particles of conductive polymer attached inside and the amount thereof falls within the range from 0.3 mg/cm$^2$ to 1.2 mg/cm$^2$ (inclusive and these values are converted to amounts per unit area of anode foil 12A). The initial ESR value is thus lowered and stabilized.

As the data of sample C1 shows, when the amount of fine particles attached inside is smaller than 0.3 mg/cm$^2$ (this value is converted to an amount per unit area of anode foil 12A), a drastically high initial ESR value is expected. The data of sample C2 shows, when the amount of fine particles attached inside exceeds 1.2 mg/cm$^2$, its advantage of lowering the ESR cannot be expected any longer, and a loss amount, which does not involve improving the movement of electrical charges, is increased.

To be more specific, the following conditions should be satisfied for the fine particles of conductive polymer to attach onto the surfaces of anode foil 12A, cathode foil 12B, and the fiber surface of separator 12C, thereby forming paths for the electric charges to move between anode foil 12A and cathode foil 12B:

air-tightness of separator 12C≤2.0 s/100 ml;

a contained amount of fine particles of conductive polymer falls within the range from 0.3 mg/cm$^2$ to 1.2 mg/cm$^2$ (inclusive and these values are converted to amounts per unit area of anode foil 12A); and a particle size is not greater than 100 nm in diameter.

the maximum operating temperature over 105° C. for a long time or undergo the reflow soldering process over 200° C. Although the capacitors receive thermal stress due to the environment discussed above, the foregoing amount of fine particles allows mitigating thermal stress and stabilizing the electric characteristics.

As the test results of samples E5 and E6 show, when an average size of the fine particles of conductive polymer is not greater than 100 nm, a high electrostatic capacity and a low ESR value can be obtained.

On the other hand, as the test result of sample C3 shows, an average particle size greater than 100 nm will decrease the electrostatic capacity and increase the ESR value, so that the electric characteristics are degraded drastically.

As the test result of sample C4 shows, an average fine-particle size smaller than 25 nm invites a greater contact resistance between the fine particles of conductive polymer, so that the ESR value increases. As a result, the average fine-particle size of conductive polymer smaller than 25 nm degrades drastically the electric characteristics.

As the test results of sample E2 and E13 show, when an air-tightness of separator 12C is not greater than 2.0 s/100 ml, the dispersions-solution containing the fine particles of which sizes are not greater than 100 nm can permeate wound-type capacitor element 12 and diffuse therein uniformly. As a result, the fine particles of conductive polymer can attach inside the entire capacitor element, such as, to the fiber surface of separator 12C, the surfaces of anode foil 12A and cathode foil 12B. As a result, the electrostatic capacity can be increased and the ESR value can be lowered.

As the test results of sample C7 and C8 show, when an air-tightness of separator 12C exceeds 2.0 s/100 ml, the permeability of the dispersions-solution into capacitor element 12 is lowered, so that the uniformity of the attached fine particles onto the fiber surface in separator 12C is lowered. As a result, the electrostatic capacity is decreased and the ESR value is increased.

As the test result of sample C9 shows, the air-tightness of separator 12C smaller than 0.5 s/100 ml prevents separator 12C from fully avoiding the contact between anode foil 12A and cathode foil 12B, so that defects caused by short increase.

The test result of sample C10 shows remarkably lower electric characteristics than that of sample E4. This tells that even if the amount of fine particles attached to a unit area of anode foil 12A reaches the upper limit, i.e. 1.2 g/cm$^2$, the capacitor like sample C7 that does not employ the electrolyte solution cannot achieve a greater electrostatic capacity nor a lower ESR value achieved by the capacitor employing the electrolyte solution.

As the test results of samples E7-E11 show, when the density of the fine particles of conductive polymer in the dispersions-solution is adjusted within the range from 1.25 wt % to 2.8 wt % (inclusive), a series of operations, i.e. impregnation into the precursor of capacitor element and removing the solvent, can be done only one time. This one-time operation allows the fine particles of conductive polymer to attach to the surfaces of anode foil 12A, cathode foil 12B, and the fiber surface of separator 12C in an amount falling within the range from 0.3 mg/cm$^2$ to 0.67 mg/cm$^2$ (inclusive and those values are converted the amounts per unit area of anode foil 12A). As a result, capacitor element 12 and the electrolyte solution are enclosed in outer package 15, thereby producing efficiently the electrolytic capacitor of excellent electric characteristics.

When a lower limit of the density of the fine particles of conductive polymer in the dispersions-solution is set at 1.67 wt %, a lower limit of the amount of the fine particles attached inside can be regulated not smaller than 0.4 mg/cm$^2$ per unit area of anode foil 12A. As a result, a sufficient amount of the fine particles of conductive polymer is obtained, so that conductive polymer layer 16 resisting to thermal stress at a high temperature can be formed. The electrolytic capacitor having higher reliabilities of heat-resistance against reflow soldering and of long term heat-resistance can be produced.

On the other hand, as the test result of sample C5 shows, when the density of the fine particles of conductive polymer in the dispersions-solution is lower than 1.25 wt %, even if a maximum amount of the dispersions-solution impregnable is input in the precursor of capacitor element, the one-time operation can only attach the fine particles in a maximum amount smaller than 0.3 mg/cm$^2$ to a unit area of anode foil 12A.

As the test result of sample C6 shows, when a density of the fine particles of conductive polymer in the dispersions-solution exceeds 2.8 wt %, the fine particles dispersed in the dispersions-solution resist diffusing uniformly inside capacitor element 12. During the film formation of the fine particles through reducing the solvent of dispersions-solution, the film thus becomes uneven, and as a result, excellent electric characteristics cannot be obtained.

As the test results of samples E2 and E12 show, when the solvent of the dispersions-solution contains polar organic dispersing agent besides water, e.g. ethylene glycol, the film made of the fine particles of conductive polymer and covering the surfaces of anode foil 12A, cathode foil 12B and the fiber surface of separator 12C increases its flatness. As a result, the electrical conductivity of filmy conductive polymer layer 16 is increased. On top of that, the amount of fine particles 16D can be reduced, where particles 16D branch from the surfaces of anode foil 12A, cathode foil 12B and the fiber surface of separator 12C and project toward the voids, namely, particles 16D do not involve the movement of electric charges.

The foregoing electrolytic capacitor of the present invention is small in size, great in capacity, and has a low ESR, low leakage current, and high dielectric strength. On top of that, this capacity has a better productivity. The electrolytic capacity is thus useful for a smoothing circuit on a power-supply side and a control circuit of audio-video devices and automotive electronics which need a long-term high reliability.

What is claimed is:

1. An electrolytic capacitor comprising:

a capacitor element including:

an anode foil having a dielectric layer on a surface of the anode foil;

a cathode foil confronting the anode foil;

a separator interposed between the anode foil and the cathode foil; and a solid electrolytic layer formed of an aggregate of fine particles of conductive polymer on the surface of the anode foil, a surface of the cathode foil, and a surface of the separator;

an electrolyte solution impregnated into the capacitor element; and an outer package enclosing the capacitor element and the electrolyte solution together therein, wherein the separator has an air-tightness falling within a range from 0.5 s/100 ml to 2.0 s/100 ml, inclusive, wherein sizes of the fine particles fall within a range from 25 nm to 100 nm, inclusive and an amount of the fine particles contained falls within a range from 0.3 mg/cm$^2$ to 1.2 mg/cm$^2$, inclusive, as converted to weight per unit area of the anode foil.

2. The electrolytic capacitor of claim 1, wherein the fine particles of conductive polymer are contained in an amount falling within a range from 0.4 mg/cm$^2$ to 1.2 mg/cm$^2$, inclusive, as converted to weight per unit area of the anode foil.

3. The electrolytic capacitor of claim 1, wherein the separator is formed of material free from fine fibers having diameters not greater than 0.1 μm and lengths not greater than 10 μm.

4. The electrolytic capacitor of claim 1, wherein the fine particles of conductive polymer contains at least one of polythiophene and a derivative of polythiophene.

* * * * *